April 18, 1961 B. M. AAGAARD 2,980,255
METHOD AND APPARATUS FOR THE GRADING OF COFFEE BEANS
Filed March 4, 1958 4 Sheets-Sheet 4

United States Patent Office 2,980,255
Patented Apr. 18, 1961

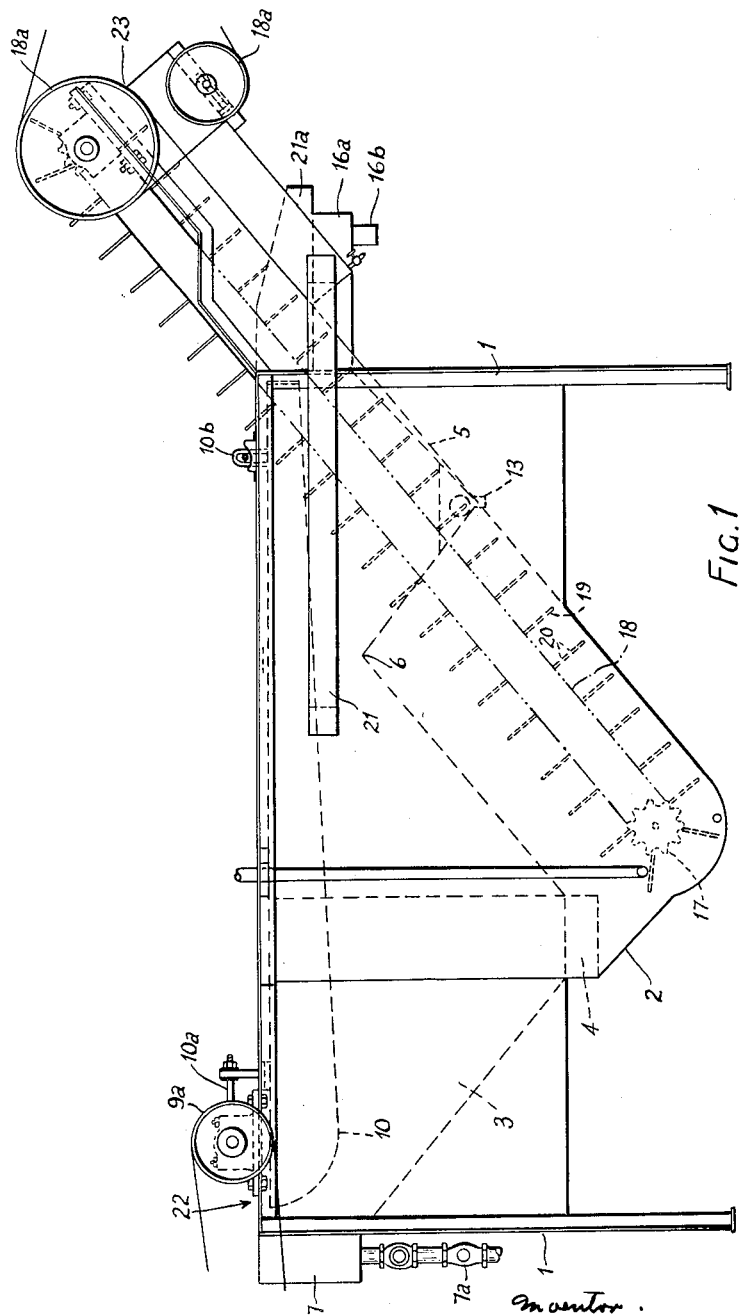

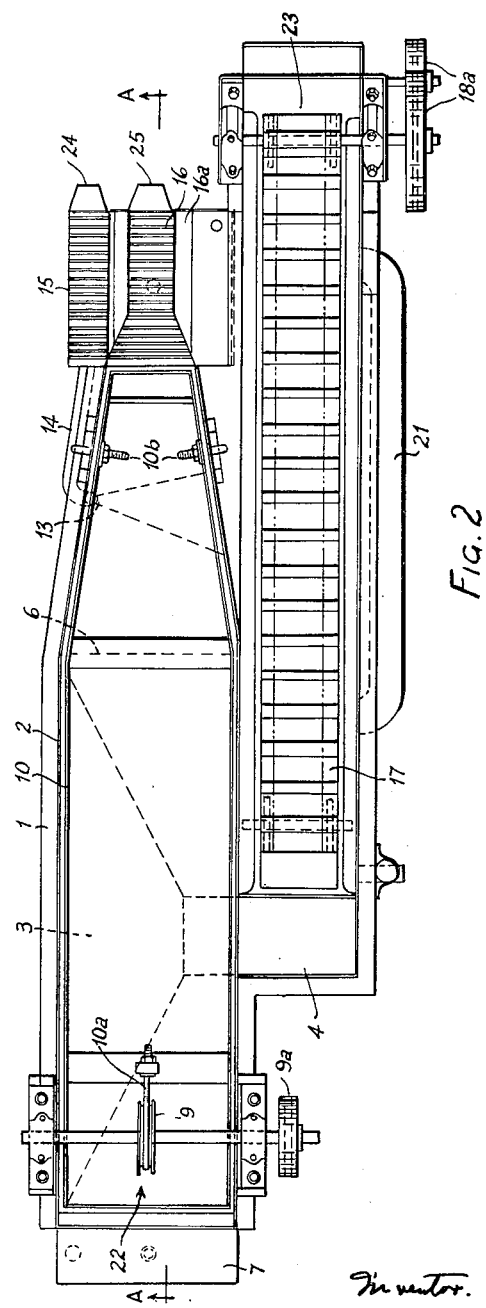

2,980,255

METHOD AND APPARATUS FOR THE GRADING OF COFFEE BEANS

Bernhard M. Aagaard, Post Box 17, Kiambu, Kenya Colony

Filed Mar. 4, 1958, Ser. No. 719,011

5 Claims. (Cl. 209—427)

The invention relates to a method and apparatus for the grading of coffee beans.

In known methods for grading coffee beans, between the pulping and fermentation processes, the skins are separated from the pulped beans by means of a rotary screen, and the beans are then passed through grading channels where they are graded and the skins which have not been separated by the rotary screen are separated. After grading, the beans are passed to the fermentation process.

This method of working has been found disadvantageous since it is unreliable and requires a great deal of water and manpower to operate.

The invention has among its objects to overcome these disadvantages and to provide a method and apparatus for grading coffee which reduces the amount of water and manpower required to a minimum.

The invention has further among its objects to separate skins from pulped beans, and to grade the coffee after pulping into grades, for example into first grade coffee beans (heavy), into second grade coffee beans being deformed beans and unpulped berries (half-light), and into third grade coffee beans and skins (floaters).

According to the invention, there is provided a method for the grading of coffee beans, in which the beans are conveyed through a liquid container by the flow of fluid through the container, and passed over and/or through jigging means mounted in the liquid, in such manner that selected grades of beans are carried into different and separate zones in the container from which they may conveniently be collected.

According to the invention furthermore, apparatus for grading coffee beans comprises a liquid container or trough divided into two or more collecting zones, jigging means mounted in the container above the collecting zones and operating to direct selected grades of beans to separate zones, and means for conveniently removing the beans from the zones.

Thus the apparatus may comprise a frame on which the liquid container or trough, advantageously in the form of an open tank, is supported. The tank is formed at a greater depth at one end than at the other and separated by a transverse ridge or weir into two zones, a first zone for the collection of first grade (heavy) beans, and a second zone, shallower than the first zone, for the collection of second grade beans (unpulped berries, half-light beans and big deformed beans). The first zone is extended laterally and with a downwardly inclined base to form an area for the collection of first grade beans, without the use of water as conveying means. Thus the beans are removed from the collecting area by a conveyor which extends parallel to the longitudinal axis of the container or trough, the conveyor being operated through an endless chain drive as by an electric motor, and being provided with resilient, for example rubber paddles, perforated to allow only the flow of water therethrough.

According to the invention furthermore, the jigger tray or screen is provided to be adjustable for height so that it may be lowered or raised in the water. If raised it will bring the bulk of the coffee entering the apparatus nearer to the surface where the current of water is strongest, thus forcing more beans towards the section for separation in the second zone. If the jigger tray or screen is lowered in the water the forward current will be reduced, thereby reducing the quantity of beans passing to the second zone.

It will be understood that the method and apparatus according to the invention may be adapted for use for the normal grading, that is to say, grading after the fermentation and culling processes, or alternatively the process may be adapted for grading the beans between the pulping process and the fermentation process.

The invention is diagrammatically illustrated by way of example in the acompanying drawings, in which—

Figure 1 is a front elevation of the apparatus according to the invention;

Figure 2 is a corresponding plan;

Figure 4:
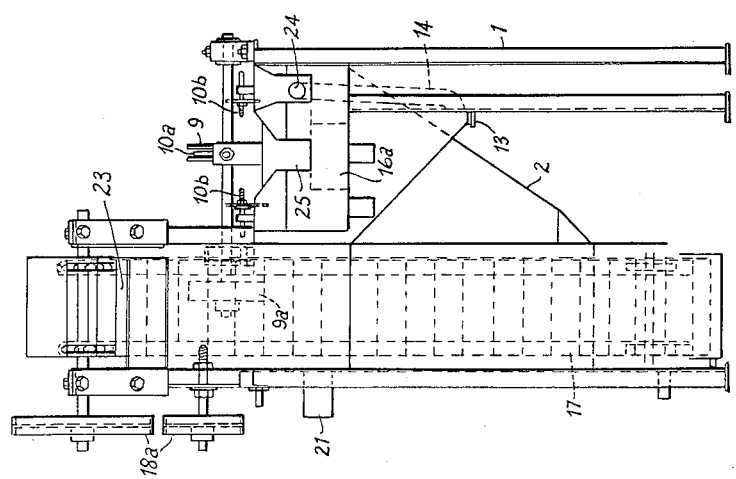
Figure 4 is a corresponding side elevation, viewed from the right-hand side of Figure 1.
Figure 3:
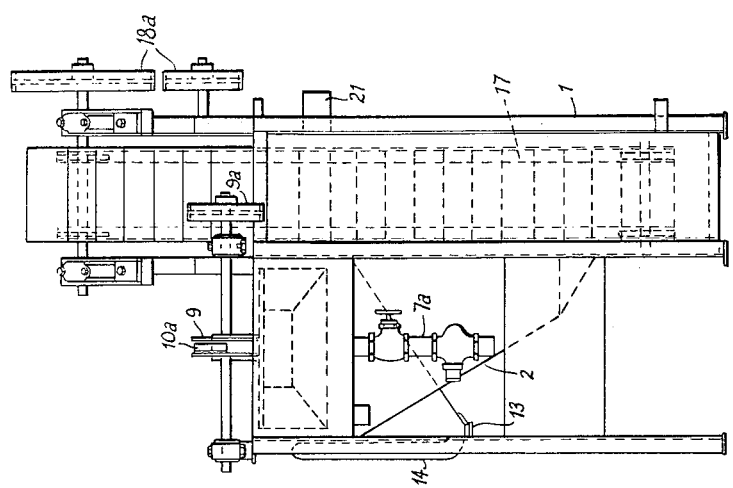
Figure 3 is a corresponding side elevation, viewed from the left-hand side of Figure 1.
Figure 5:
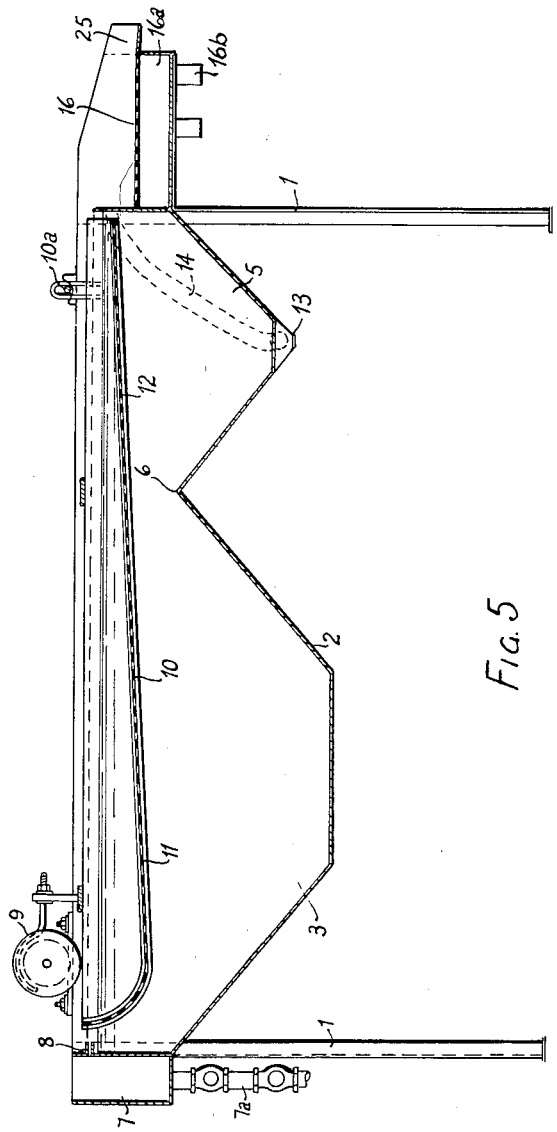
Figure 5 is a section on the line A—A of Figure 2.

Referring to the drawings the apparatus comprises a frame 1 on which is supported a tank or trough 2, formed with a taper at the outlet end (right-hand side of Figure 1) and divided by shape and depth into three separating and collecting zones 3, 4, and 5. The zone 4 is a lateral offshoot of the zone 3 and is deeper than the zone 3. The zone 5 is a continuation of the zone 3 and shallower than the zone 3, being separated therefrom by a transverse ridge or weir 6 which is submerged when the tank or trough 2 is filled with water.

Water flows continuously into the trough 2 through a water box 7 having an adjustable outlet slot 8. The box 7 is in communication with a pipeline 7a from the main water supply. At the water inlet end of the tank 2 is mounted an adjustable eccentric 9 which is belt-driven through a pulley 9a as from an electric motor (not shown) and operates to impart a jigging motion to a shallow perforated tray or screen 10 supported on a moving and removable cradle 10a and on members 10b, the tray or screen 10 being deeper at the inlet end than at the outlet end, and extending substantially the length of the trough or tank 2. The tray or screen 10 is almost completely submerged with the edge only projecting above the level of the water in the trough or tank 2 when the apparatus is in operation.

The tray or screen 10 is adjustable in height for lowering or raising in the water as desired.

The perforations 11 at the outlet end of the tray or screen 10 are smaller over the first zone 3 than the perforations 12 in that part of the screen disposed above the zone 5.

The narrow tapered bottom 13 of the zone 5 is connected by a substantially vertically extending pipe 14 to a draining plate 15.

A draining plate 16 extends in alignment with the longitudinal axis of the trough parallel to the draining plate 15, beneath which is provided a water-collecting box 16a leading to a pipe 16b extending substantially horizontally just beneath water level. The pipe 16b is provided with a stopcock 16c to control the discharge of the water. The water may be passed back through the tank or trough 2 by a suitable connection (not shown), or alternatively, the water may be employed for conveying the first grade coffee beans to the fermenting tanks.

Extending at an inclination with its lower end below the lowest level of the zone 3, and parallel to the longitudinal axis of the tank or trough 2 is a conveyor 17 formed as an endless chain 18 driven through pulleys 18a with paddles 19 having perforations 20 to permit the passage of water, but not of beans. A return water pipe 21 extends between a collecting tank 21a at the top of the conveyor and the tank or trough 2 at a position substantially at water level.

In operation ungraded beans and the bean skins are fed in the screen or tray at the position indicated by the reference 22, and are moved forwardly by the current of water flowing in through the slot 8 in the box 7. The heavier beans (Grade I) sink down in the first zone 3 through the perforations 11 in the jigger tray or screen 10 and slide laterally into the zone 4 whence they are paddled upwardly by the conveyor 17 to an outlet indicated by the reference 23 on the drawings, whence they may be passed to the fermenting tanks by any convenient means. Measures are taken to ensure the minimum movement of water in the zone 4 to maintain same in a quiescent state at zone 4. This may be accomplished by insuring that the water at the upper end of the conveyor 17 is not permitted to flow out, but is directed through the return pipe 21 back to a position at or near the water level of the tank 2. Thus, the movement of water through the zones 3 and 4 is thus substantially unaffected and there is no down current tending to pull the lighter coffee beans and skins into the zone 3.

The second grade beans, being lighter than the first grade beans are carried by the current of water towards the right-hand end (Figure 1) of the jigger tray or sceeen 10 where they sink down to pass through the holes 12 of of larger dimensions into the zone 5. The beans are conveyed from the bottom 13 of the zone 5 through a pipe 14 by the current of water onto a draining plate 15 where the water is drained back to the tank, the excess water passing to an outlet indicated by the reference 24 in the drawings. It will thus be understood that a down current is created over the zone 5 which helps to draw downwardly the second grade beans and the unpulped berries through the holes 12 in the jigger tray or screen 10.

Third grade coffee beans and skins, which float, do not sink down through that part of the jigger tray 10 above the zones 3 or 5. Rather, such beans and skins are conveyed by the current of the water out through an outlet at the tapered end of the trough, indicated in the drawing by the reference numeral 25, onto the draining plate 16. The beans and skins thus collected thereon are removed. The excess water flows over the draining plate 16 down to the collection box 16a positioned below the draining plate 16 and out through the return pipe 16b which extends substantially horizontally just below the water level in the tank or trough 2.

The tray or screen 10 is adjustable for height. If it is raised the coffee beans are brought nearer to the surface of the water in the tank where the forward driving current of water is strongest, thus forcing a greater quantity of beans towards the outlet end over the zone 5. If the tray is lowered the forward moving force on the beans is reduced, thus reducing the quantity of beans passing to the outlet end.

The grading of the beans can also be varied by varying the rate of flow of water through the inlet 8 to the trough or tank 2.

I claim:
1. The method of grading coffee beans in a water medium which comprises maintaining a relatively quiescent body of water, causing an upper portion of the body of water to flow over a pair of side-by-side compartments and through an outlet, withdrawing water from a lower portion of the second of said compartments whereby a downwardly flowing body of water is created between the quiescent body and the overflow, and feeding coffee beans to the water flowing over the quiescent body of water whereby the heavy beans sink into the quiescent body of water, floating the light beans over the overflow with the overflowing water, entraining beans of intermediate specific gravity by the downwardly flowing water passing through the outlet and separately removing the sorted beans from the water.

2. Apparatus for grading coffee beans into three grades, said grades being, by weight, heavy, light, and floatable, comprising liquid receptacle means having one end thereof at a depth greater than the other end, transversely extending means separating said receptacle means into a deeper collection zone for collecting the heavy grade of beans, and a shallower collection zone for collecting the light grade of beans, discharge means at the bottom of each of said collection zones for carrying off said heavy grade and said light grade beans, means for feeding water into said receptacle means at the end having the greatest depth, liquid overflow means at the opposite end of said receptacle means for insuring a flow of liquid from one end of said receptacle means to the other, means for feeding coffee beans to the end of the container adjacent the liquid feeding means, and means for maintaining the liquid in the deeper compartment zone adjacent the liquid feeding means below its surface thereof in a substantially quiescent state while allowing the removal of the heavy grade coffee beans through the outlet end of said deeper collection zone, the discharge means at the bottom of said shallower collection zone including liquid outlet means for creating a downward flow of liquid and through which liquid and light grade coffee beans will be withdrawn, the remaining floatable grade of said coffee beans being carried on the surface of the liquid by said liquid overflow means.

3. Apparatus in accordance with claim 2 wherein liquid feeding means provide a horizontally directed jet to propel the beans across said receptacle means toward the liquid overflow means.

4. Apparatus in accordance with claim 3 wherein a jigging screen is provided across the container and is submerged in the liquid in said container.

5. Apparatus in accordance with claim 2 including conveyors to remove the coffee beans separately at the discharge end of the two collection zones.

References Cited in the file of this patent

UNITED STATES PATENTS

| | | |
|---|---|---|
| 190,324 | Hooper | May 1, 1877 |
| 540,659 | Hancock | June 11, 1895 |
| 922,419 | Hackstaff | May 18, 1909 |
| 1,014,308 | Keller et al. | Jan. 9, 1912 |
| 2,246,532 | Prins | Apr. 17, 1940 |

FOREIGN PATENTS

| | | |
|---|---|---|
| 2,907 | Great Britain | Feb. 5, 1907 |